United States Patent
Staahl et al.

(10) Patent No.: US 9,890,826 B2
(45) Date of Patent: Feb. 13, 2018

(54) SENSOR DEVICE AND DISC BRAKE COMPRISING A SENSOR DEVICE

(71) Applicant: KNORR-BREMSE Systeme fuer Nutzfahrzeuge GmbH, Munich (DE)

(72) Inventors: Christian Staahl, Munich (DE); Matthias Klingner, Moorenweis (DE); Michael Peschel, Schoengeising (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 15/155,291

(22) Filed: May 16, 2016

(65) Prior Publication Data

US 2016/0258501 A1    Sep. 8, 2016

Related U.S. Application Data

(63) Continuation of application No. PCT/EP2014/074507, filed on Nov. 13, 2014.

(30) Foreign Application Priority Data

Nov. 20, 2013 (DE) .................... 10 2013 112 813

(51) Int. Cl.
*F16D 65/56* (2006.01)
*F16D 66/02* (2006.01)
(Continued)

(52) U.S. Cl.
CPC ....... *F16D 65/568* (2013.01); *F16D 55/2255* (2013.01); *F16D 66/00* (2013.01);
(Continued)

(58) Field of Classification Search
CPC ...... F16D 65/568; F16D 66/00; F16D 66/026; F16D 66/02; F16D 66/024; F16D 2066/003; F16D 55/2255; F16D 55/225; G01L 5/28
(Continued)

(56) References Cited

U.S. PATENT DOCUMENTS 7,926,626 B2    4/2011    Iraschko
8,752,422 B2    6/2014    Helf
(Continued)

FOREIGN PATENT DOCUMENTS

DE    10 2004 037 771 A1    3/2006
DE    10 2006 042 777 B3    10/2007
(Continued)

OTHER PUBLICATIONS

International Search Report (PCT/ISA/210) issued in PCT Application No. PCT/EP2014/074507 dated Mar. 11, 2015 with English translation (Four (4) pages).
(Continued)

*Primary Examiner* — Robert A Siconolfi
*Assistant Examiner* — San Aung
(74) *Attorney, Agent, or Firm* — Crowell & Moring LLP

(57) ABSTRACT

A sensor device for a disc brake has a sensor gearing which can be coupled to at least one encoder, wherein the sensor gearing is arranged in a housing as a planetary gear mechanism and has an input for a first variable, which can be detected by the sensor device and which is associated with wear of the disc brake, and has an input for a second variable, which can be detected by the sensor device and which is associated with an operating movement of the disc brake. The sensor device can be changed over from a first state for detecting the first variable, which is associated with wear of the disc brake, and the second variable, which is
(Continued)

associated with an operating movement of the disc brake, to a second state for detecting only the first variable, which is associated with wear of the disc brake.

20 Claims, 10 Drawing Sheets

(51) Int. Cl.
  *F16D 55/2255* (2006.01)
  *F16D 66/00* (2006.01)
  *F16D 55/225* (2006.01)
(52) U.S. Cl.
  CPC .......... *F16D 66/026* (2013.01); *F16D 55/225* (2013.01); *F16D 66/02* (2013.01); *F16D 2066/003* (2013.01)
(58) Field of Classification Search
  USPC ....... 188/1.11 L, 1.11 W, 1.11 R, 18 A, 71.8, 188/71.9, 72.4, 79.51, 79.55; 303/122.03; 701/34.4
  See application file for complete search history.

(56) References Cited

U.S. PATENT DOCUMENTS

| | | | | |
|---|---|---|---|---|
| 2002/0112927 | A1* | 8/2002 | Giering | F16D 65/183 188/1.11 W |
| 2009/0177362 | A1* | 7/2009 | Schmitt | F16D 66/025 701/70 |
| 2010/0230219 | A1* | 9/2010 | Helf | F16D 65/183 188/71.8 |
| 2013/0139580 | A1* | 6/2013 | Helf | F16D 65/568 73/121 |
| 2013/0240305 | A1* | 9/2013 | Thomas | F16D 65/183 188/72.4 |
| 2014/0353094 | A1* | 12/2014 | Welin | B60T 17/22 188/18 A |

FOREIGN PATENT DOCUMENTS

| | | |
|---|---|---|
| DE | 10 2010 032 515 A1 | 2/2012 |
| DE | 10 2012 102 582 A1 | 9/2013 |
| EP | 1 892 435 B1 | 11/2009 |

OTHER PUBLICATIONS

German-language Written Opinion (PCT/ISA/237) issued in PCT Application No. PCT/EP2014/074507 dated Mar. 11, 2015 (Five (5) pages).

German-language Office Action issued in counterpart German Application No. 10 2013 112 813.0 dated May 27, 2014 (Eight (8) pages).

International Preliminary Report on Patentability (PCT/IB326, PCT/IB/338 & PCT/IB/373) issued in PCT Application No. PCT/EP2014/074507 dated Jun. 2, 2016, including English translation of document C2 (German-language Written Opinion (PCT/ISA/237) previously filed on May 16, 2016 (seven (7) pages).

* cited by examiner

SENSOR DEVICE AND DISC BRAKE COMPRISING A SENSOR DEVICE

CROSS REFERENCE TO RELATED APPLICATIONS

This application is a continuation of PCT International Application No. PCT/EP2014/074507, filed Nov. 13, 2014, which claims priority under 35 U.S.C. § 119 from German Patent Application No. 10 2013 112 813.0, filed Nov. 20, 2013, the entire disclosures of which are herein expressly incorporated by reference.

BACKGROUND AND SUMMARY OF THE INVENTION

The invention relates to a sensor device for a disc brake, in particular for a motor vehicle, having a sensor gearing which is coupleable to at least one encoder. The invention also relates to a disc brake having a sensor device of this type.

Sensor devices of this type are used for detecting a state of wear of brake pads and a brake disc of a disc brake. Furthermore, sensor devices are also used for the detection of an actuation stroke of a brake-application apparatus of a disc brake, in order thereby to determine a present air gap.

Disc brakes of this type are commonly actuated by way of compressed air and equipped with automatically acting, mechanical wear-compensating readjustment apparatuses. This wear-compensating readjustment apparatuses operate in a very reliable manner and decrease the size of an air gap that has become too large. They are known in various embodiments, such as for example mechanical readjusters with automatic regulation of a friction point. Here, the readjustment apparatus is activated during every brake actuation, for example by way of an advancing element of a brake-application apparatus of the disc brake. In the event of wear of brake pads and brake disc, an automatic readjustment of the pads is performed by way of the wear-compensating readjustment apparatus, for example by way of an adjustment movement of threaded tubes that are variable in length.

An example of a readjustment apparatus is described in DE 10 2004 037 771 A1. Here, a drive rotational movement is transmitted for example from a torque limiting device, for example with a ball ramp, via a continuously acting clutch (slip clutch) to an adjustment spindle of a threaded tube.

For detection of the wear, it is possible for a linear movement of a readjustment element to be directly detected. The readjustment element, for example a readjustment spindle, performs the entire actuation stroke and the readjustment travel. An example of this is illustrated in EP 1 892 435 B1. Here, it is considered to be a disadvantage that the actuation stroke is considerably smaller than the wear travel. Numerical examples in the case of a conventional brake are, for example, an actuation stroke of approximately 4.5 mm and a readjustment travel of approximately 60 mm.

A measurement encoder must therefore simultaneously have a large measurement range and a high resolution. Since these characteristics are generally contradictory, this leads to an expensive sensor. Furthermore, the transmission to a vehicle control system is made more difficult. A presently common interface from a brake to a vehicle control system is an analog transmission in the case of which an electric voltage in relation to a common ground corresponds to the measurement value. Since the readjustment travel determines the amplitude of the transmission signal, the signal amplitude will, owing to the actuation stroke, exhibit the same relationship as a maximum actuation stroke to a maximum wear travel. In this regard, a numerical example of the abovementioned conventional brake will be specified. The voltage amplitude is 2.5 V. In the case of a wear travel of 60 mm, the characteristic curve of the sensor must therefore be designed for 2.5 V/60 mm=47.7 V/m in order to cover the entire measurement range. If one assumes noise with an amplitude of 20 mV, the actuation stroke can thus be determined at best with an accuracy of 0.48 mm. An air gap is generally in a size range of 0.5 . . . 1.2 mm, and is very difficult to determine in this way.

One possibility for circumventing the problem discussed above lies in the use of a separate linear sensor or of a rotation sensor for the actuation stroke. The second sensor may then exhibit a higher resolution in a smaller measurement range. A disadvantage here is the outlay in terms of parts, with associated work outlay, owing to the additional sensor, additional lines or signal processing electronics for the electrical transmission of the two signals.

DE 102010032515 A1 describes a brake wear sensor of a disc brake. Here, a superposition of readjustment travel and actuation stroke is realized by way of a planetary gearing. The readjustment travel is introduced as a rotational movement into the sun gear of the planetary gearing. For example, the rotational movement of a readjustment spindle is expedient for this purpose. The actuation stroke is introduced as a further rotational movement via the planet carrier of the planetary gearing. The rotation of the internal gear of the planetary gearing is detected by way of a suitable encoder, for example a Hall sensor, a potentiometer, an inductive, optical or acoustic encoder element. In this way, it is possible to realize a transmission ratio of the readjustment movement in the range of for example 10, and a transmission ratio of the actuation stroke in the range of for example 1. Thus, on the internal gear, deflection amplitudes in the same magnitude range arise owing to the two input variables, and can be used with the encoder with a measurement range adapted to the required resolution.

Owing to the ever-increasing demand to reduce the number of parts and therefore costs, wherein at the same time quality and benefit should be not only maintained but increased and furthermore, increased capability for adaptation to different usage conditions is demanded, there is a corresponding requirement for an improved sensor device.

It is the object of the present invention to provide an improved sensor device. It is a further object to provide an improved disc brake.

The object is achieved by way of a sensor device, as well as a disc brake having the sensor device, in accordance with embodiments of the invention.

A sensor device is provided which, in terms of its construction, can be easily converted for different tasks using a small number of parts. In this way, it is for example possible for an amount of stock to be reduced and to still be easily and quickly converted for different purposes shortly before use.

A sensor device according to the invention for a disc brake has a sensor gearing which is couplable to at least one encoder, wherein the sensor gearing is arranged in a housing as a planetary gearing and has an input for a first variable to be detected by the sensor device, which first variable is associated with wear of the disc brake, and an input for a second variable to be detected by the sensor device, which second variable is associated with an actuation stroke of the disc brake. The sensor device is capable of being converted from a first state, for detecting the first variable which is associated with wear of the disc brake and detecting the second variable which is associated with an actuation stroke of the disc brake, into a second state, for detecting only the first variable which is associated with wear of the disc brake.

A disc brake according to the invention, in particular for a motor vehicle, having a brake-application apparatus with a spreading mechanism, preferably with a brake rotary lever, and a wear-compensating readjustment apparatus which has at least one mechanical readjustment device which is preferably insertable into a spindle unit of the disc brake and coupled to the spreading mechanism, preferably to the brake rotary lever, is equipped with a sensor device according to the invention. The input of the sensor gearing of the sensor device for the first variable to be detected is coupled to the at least one mechanical readjustment device, and the input of the sensor gearing of the sensor device for the second variable to be detected is coupled to the spreading mechanism, preferably to the brake rotary lever, by way of a stroke sensor drive.

In this way, it is made possible for the actuation stroke, which is a linear movement aside from the pivoting movement of a bridge of the disc brake, to be converted into a rotational or pivoting movement and transmitted to the second input of the sensor gearing.

In this embodiment of the sensor device, the sensor gearing is equipped with an interface for the coupling of an encoder. The interface may for example be a rotationally fixed plug-type connection. In this way, retroactive assembly is made possible even with different encoders.

The spreading mechanism, preferably the brake rotary lever, drives two drives, specifically firstly the readjustment device and secondly the stroke sensor drive.

In one embodiment, the input of the sensor gearing for the first variable to be detected is a sun gear of the sensor gearing, and an input for the second variable to be detected is a planet carrier of the sensor gearing with a planet carrier toothing. The planetary gearing serves as a single sensor gearing for the superposition of both input variables, and can be used without itself being modified.

In a further embodiment, in the first state of the sensor device, the input for the second variable to be detected is in engagement with a stroke sensor drive unit, and in the second state of the sensor device, the input is blocked. In this way, a simple adaptation to the two states is possible by way of a conversion.

Here, the stroke sensor drive unit has at least one toothed gear which, in the first state of the sensor device, engages with the planet carrier toothing, which is an external toothing, in an opening of the housing. With the at least one toothed gear, a transmission with a particular transmission ratio is possible, whereby the subsequent rotation of the internal gear owing to the actuation stroke can be coordinated with the rotation of the internal gear owing to the readjustment, that is to say by the first input. The transmission may be performed with a small amount of play, wherein the actuation stroke can be detected with high accuracy and a high resolution, in contrast to the prior art.

Furthermore, the pivoting of the brake rotary lever, which is for example in the form of an eccentric lever, may be used for introducing the actuation stroke as a pivoting/rotational movement into the planetary gearing. The problem whereby the pivot axes of the brake rotary lever and readjustment spindle or sensor axis of the sensor device do not lie in a plane and have an axial offset is solved by way of the toothed gear, wherein the axial offset is compensated in a simple manner. This is advantageous because the axial offset is a result of the design of the brake rotary lever as an eccentric lever, and, for structural space reasons, cannot be compensated.

In a further embodiment, it is provided that the at least one toothed gear is rotatably mounted, and axially delimited, in a bracket and in the housing. Thus, simple enhancement and installation of the toothed gear is made possible.

If the bracket is fastenable in removable fashion to the housing, the toothed gear can be installed quickly.

In another embodiment, the input for the second variable to be detected is, in the second state of the sensor device, rotationally fixedly blocked by at least one fixing tooth of a bracket which is connected rotationally fixedly to the housing, wherein the at least one fixing tooth is in engagement with the planet carrier toothing, which is an external toothing, in an opening of the housing. Thus, an existing toothed gear with bracket can be easily and quickly exchanged for a bracket with integrated fixing toothing, whereby a quick conversion is possible.

Reversible conversion is possible if the bracket is fastenable in removable fashion to the housing.

In an alternative embodiment, the input of the sensor gearing for the first variable to be detected is a drive shaft with at least one gearing stage which is coupled to a sun gear of the sensor gearing, and an input for the second variable to be detected is a planet carrier of the sensor gearing with a planet carrier toothing. The abovementioned axial offset is in this case compensated by the spacing of drive shaft and sun gear. The sensor gearing can, however, maintain its space requirement.

It is furthermore provided that, in the first state of the sensor device, the input for the second variable to be detected is in engagement with a stroke sensor drive unit or is provided for direct engagement of a stroke sensor actuator of an associated disc brake. In the second state of the sensor device, the input is blocked. Since the lever pivot axis and the axis of the input, that is to say of the planet carrier, lie in one plane, the stroke sensor actuator can engage directly with the planet carrier. It is self-evidently also possible for one or more gearing stages to be interposed.

In another embodiment, in the second state of the sensor device, the input for the second variable to be detected is rotationally fixedly blocked by at least one fixing arm, wherein the at least one fixing arm is in engagement with the planet carrier toothing, which is an external toothing. For a quick conversion, the at least one fixing arm may be fastenable in removable fashion to the housing. Thus, reversible conversion is possible. An irreversible conversion is self-evidently also possible if the at least one fixing arm is connected severably to the housing by way of a predetermined breaking section.

It is advantageous if the at least one fixing arm, in the form of an insert part, is insertable rotationally fixedly into, and removable from, the housing, because a simple and quick reversible conversion is possible in this way.

In a further embodiment, the above sensor device has at least one encoder which is coupled to the sensor gearing. The sensor device may thus be formed as a preassembled structural unit together with an encoder.

A disc brake is formed with at least two spindle units, wherein the at least one mechanical readjustment device is coupled to a driver by way of a synchronization unit. Here, the input of the sensor gearing of the sensor device for the first variable to be detected is coupled to a driver shaft of the driver. Effective structural space utilization is made possible in this way.

Owing to the right-angled arrangement of the lever pivot axis and axis of rotation of the readjustment spindle, the stroke sensor drive has an angular gearing. An angular gearing is, with few exceptions, considerably more sensitive to tolerances than a spur gear mechanism.

In another embodiment, the axial offset between a plane of a lever pivot axis of the brake rotary lever and a plane of a sensor axis of the sensor device is compensated by way of at least one gearing stage of the stroke sensor drive unit. Accordingly, an angular gearing, even with a crown toothing, is possible. The crown gear toothing is relatively insensitive with regard to position tolerances. Also self-evidently possible is, for example, a hypoid gearing, wherein a sensitivity with regard to position tolerances is increased, and quality control could be made more cumbersome.

In an alternative embodiment, the sensor device is arranged in the disc brake such that an axial offset between a plane of a lever pivot axis of the brake rotary lever, in which a sensor axis of the sensor device lies, and a plane of an axis of a spindle unit is compensated by at least one gearing stage of a drive shaft which is an input of the sensor gearing of the sensor device for the first variable to be detected. Here, the stroke sensor actuator, for example with a crown gear toothing, may interact directly with the planet carrier, or else with the internal gear.

The disc brake may also be actuated by compressed air.

For realization of variants of the sensor device, it is particularly advantageous for as many identical parts as possible to be able to be used, and for only very few parts to be required for conversion purposes. In the prior art, a variant only with readjustment travel detection can be realized only by virtue of the planet carrier being fixed.

By contrast, by replacing the toothed gear with a fixing component, that is to say with the bracket with integrated fixing tooth, the sensor variant without actuation stroke detection can be easily, even reversibly, converted. The number of identical parts is particularly advantageously high.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
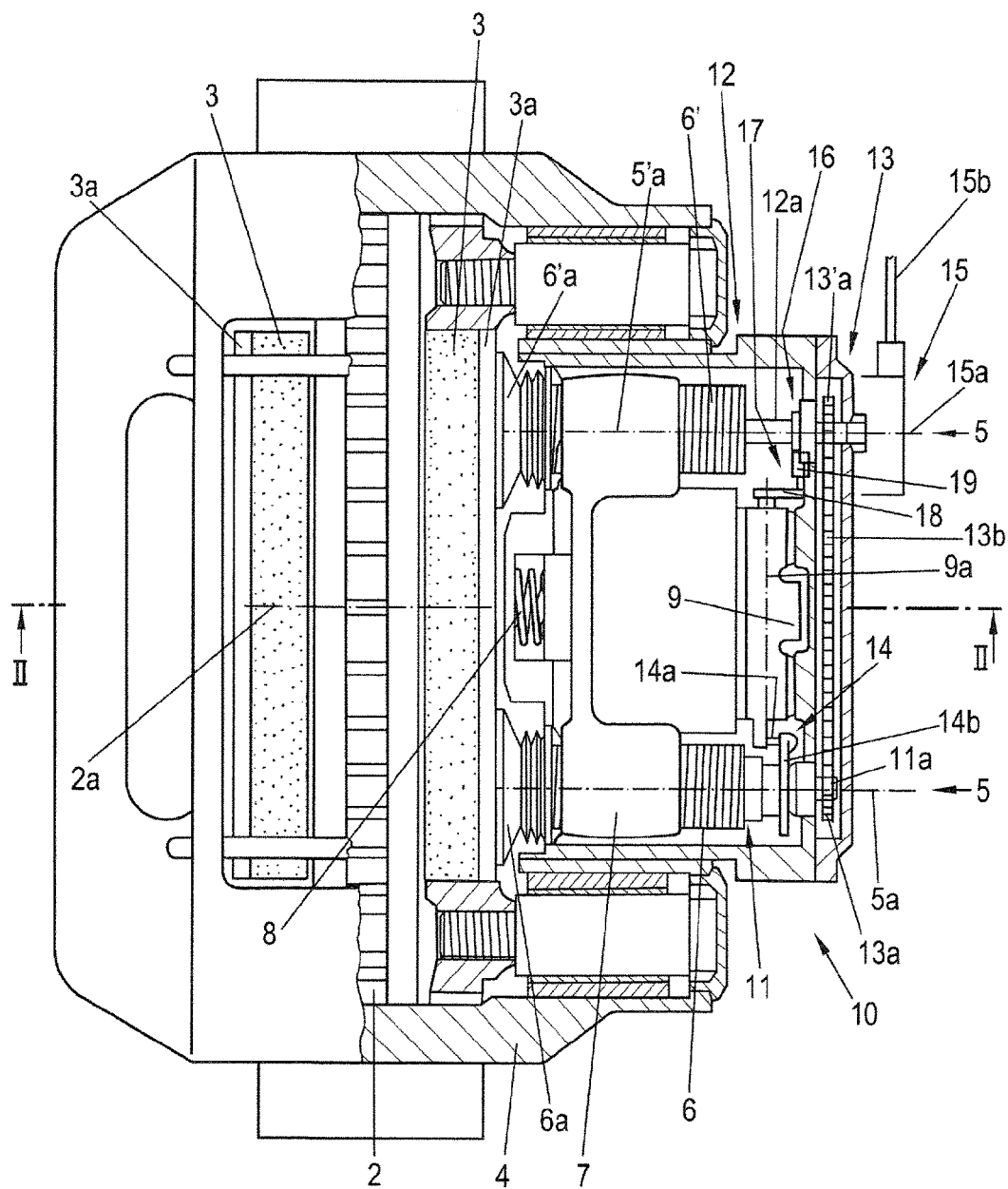
FIG. 1 is a schematic partially sectional view of an exemplary embodiment of a disc brake according to the invention with a sensor device according to the invention.
Figure 2:
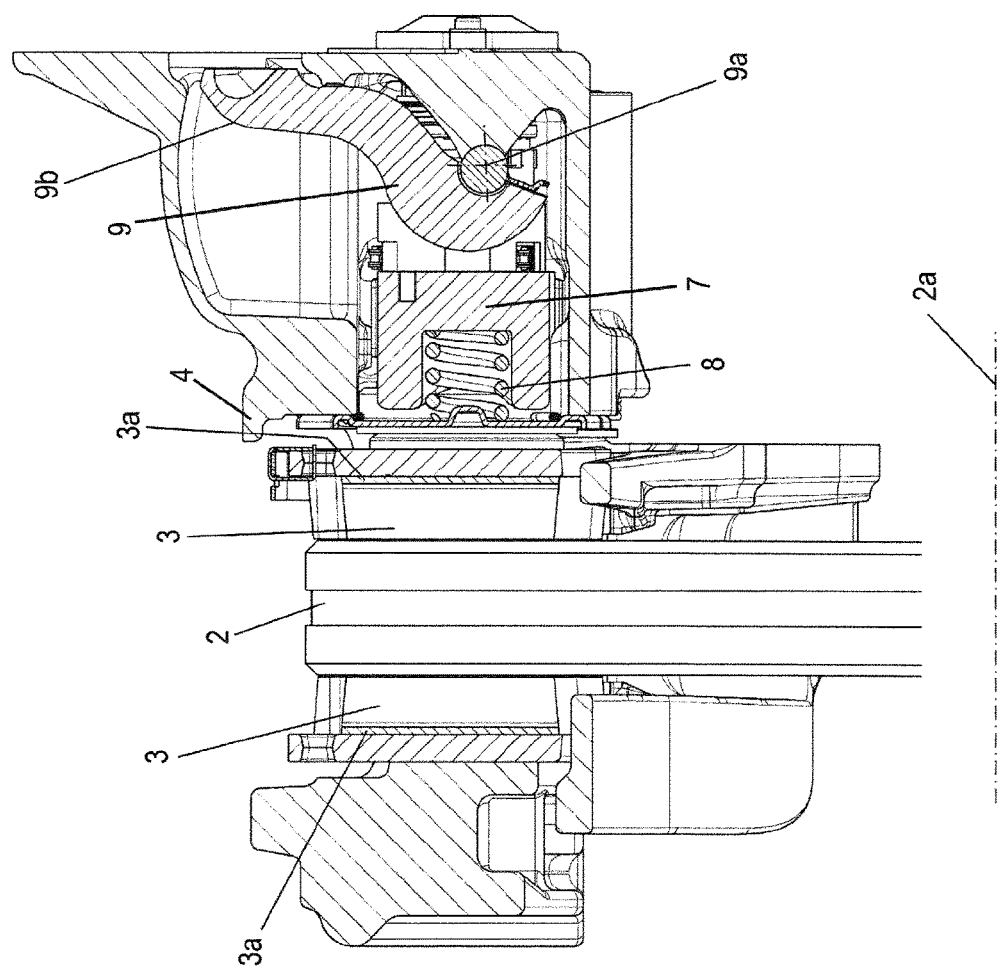
FIG. 2 is a schematic sectional view of the exemplary embodiment along the line II-II as per FIG. 1.

FIG. 1 shows a schematic perspective view of an exemplary embodiment of a disc brake 1 with a sensor device 15 and with a wear-compensating readjustment apparatus 10. FIG. 2 shows a schematic sectional view of the exemplary embodiment along the line II-II as per FIG. 1.

In this exemplary embodiment, the disc brake 1 is shown in an embodiment as a two-plunger brake with a brake caliper 4 which engages over a brake disc 2. The brake disc 2 is rotatable about a brake disc axis 2a, wherein, on both sides of the brake disc 2, in each case one brake pad 3 is arranged on a brake pad support 3a. Furthermore, the disc brake 1 is formed with a brake-application apparatus, which in this case is embodied with a brake rotary lever 9, for the application of the disc brake 1. The brake rotary lever 9 is also referred to as a spreading mechanism, is part of the brake-application apparatus, is pivotable about a lever pivot axis 9a, and has a lever arm 9b, which can be actuated for example by a compressed-air brake cylinder. Here, the brake rotary lever 9 is mounted on the brake caliper 4, by way of a bearing seat that is not shown in any more detail, so as to be pivotable about the lever pivot axis 9a.

A bridge 7 is in contact with the brake rotary lever 9 and can be actuated in the direction of the brake disc axis 2a, toward the brake disc 2 and back, by the brake rotary lever during the application and release of the brake. The bridge 7 is, at its lateral ends, coupled in each case to a spindle unit 5, 5' by way of in each case one threaded tube 6, 6'. Each spindle unit 5, 5' has an axis 5a, 5'a, wherein the axis 5a of the spindle unit 5 can be referred to as readjuster axis 5a and the axis 5'a of the spindle unit 5' can be referred to as driver axis 5'a. The readjuster axis 5a and the driver axis 5'a run parallel to the brake disc axis 2a and are at right angles to the lever pivots axis 9a.

Those ends of the spindle units 5, 5' which are arranged on the left in FIG. 1 and which face toward the brake disc 2 are equipped in each case with a thrust piece 6a, 6'a. The thrust pieces 6a, 6'a are in contact with a brake pad support 3a of a brake-application-side brake pad 3, which is arranged on one side of the brake disc 2 of the disc brake 1. A further brake pad 3 with brake pad support 3a is fixed in the brake caliper 4 on the other side of the brake disc 2. The further brake pad 3 is also referred to as reaction-side brake pad 3. The brake caliper 4 may, for example, be a sliding caliper.

A spacing between a brake pad 3 and the brake disc 2 is referred to as an air gap. During a braking process, during an actuation of the disc brake 1, it is firstly the case that the air gap is bridged by virtue of the brake pad 3 being adjusted toward the brake disc 2 of the disc brake 1 by the bridge 7 that is actuated by the brake lever 9. The air gap increases in size owing to the wear of the brake pads 3 and of the brake disc 2.

The expression "friction point" is the point at which the brake pad 3 bears against the brake disc 2 of the disc brake 1. During the brake-application process, the friction point is reached after the air gap has been bridged. A further brake-application action then gives rise to a braking action, by virtue of the brake pad 3 being pressed against the brake disc 2. This self-evidently also applies to the reaction-side brake pad 3. A release of the brake-application apparatus effects a reversal of the above-described process.

In the embodiment shown in FIG. 1, the disc brake 1 furthermore includes a wear-compensating readjustment apparatus 10 which serves for the readjustment of the brake pad 3/of the brake pads 3 in the event of wear in order to restore the original air gap.

The wear-compensating readjustment apparatus 10 includes a readjustment device 11 with a readjuster shaft 11a, a driver 12 with a driver shaft 12a, and a synchronization unit 13 for the coupling of readjustment device 11 and driver 12.

The readjustment device 11 will not be discussed in more detail here, but may be designed, for example, as described in DE 10 2004 037 771 A1, and is, in the spindle unit 5, inserted into and coupled to the associated threaded tube 6. A longitudinal axis of the readjuster shaft 11a forms the readjuster axis 5a.

By means of the synchronization device 13, the readjustment device 11 is coupled to the driver 12 such that a rotation of the readjuster shaft 11a and of the threaded tube 6 connected rotationally conjointly thereto is transmitted synchronously to the driver shaft 12a and thus to the threaded tube 6' that is connected rotationally conjointly to the driver shaft 12a. In FIG. 1, the synchronization unit 13 is illustrated merely schematically, wherein the readjuster shaft 11a is connected rotationally conjointly to a synchronization gear 13a, in this case a sprocket, of the synchronization unit 13. The synchronization gear 13a is connected via a synchronization means 13b, in this case a chain, to a further synchronization gear 13'a, which is rotationally conjointly coupled directly or indirectly to the driver shaft 12a. This embodiment of the synchronization unit 13 is to be understood merely as an example; other coupling configurations, for example of the threaded tubes 6, 6' to one another, are self-evidently also possible.

Every advancing movement of the brake rotary lever 9, in the case of which the brake rotary lever 9 pivots counter-clockwise (FIG. 2) about its lever pivot axis 9a, causes the readjustment device 11 to be driven. This is performed by way of a readjuster drive 14, which includes an actuator 14a fixedly connected to the brake rotary lever 9 and includes a readjuster drive element 14b coupled to the readjustment device 11. The actuator 14a and the readjuster drive element 14b are in engagement with one another. The actuator 14a may, for example, be in the form of a pin. The readjuster drive element 14b may, for example, be equipped with a shift fork which interacts with the actuator 14a.

If, during the advancing movement of the brake rotary lever 9, (it is still the case that) no wear is present, then it is the case, for example owing to an overload coupling of the readjustment device 11, that no transmission of a drive movement to the readjuster shaft 11a is performed. However, if wear is present, the drive movement is transmitted to the readjuster shaft 11a of the readjustment device 11 in order to readjust the brake pad 3, whereby the air gap is set to the original value. By way of the synchronization unit 13, the drive movement of the readjuster shaft 11a is transmitted to the driver shaft 12a.

The disc brake 1 is equipped with a sensor device 15. In a first state, the sensor device 15 is designed to detect a first variable, specifically the wear of the brake pads 3 and that of the brake disc 2, and to detect a second variable, specifically an actuation stroke of the brake-application apparatus. The sensor device 15 can be converted from the first state into a second state. In the second state, the sensor device 15 detects only one variable, specifically the first variable, the wear. The convertibility of the sensor device 15 will be described in detail further below.

The detection of the first variable, specifically of the wear, is performed for example through the detection of the readjustment movement of the readjuster shaft 11a and/or of the driver shaft 12a. For this purpose, the sensor device 15 is formed with an encoder (not shown), for example a Hall sensor, a potentiometer, an inductive and/or optical and/or acoustic encoder element. The encoder is connected via a sensor connection line 15b to an evaluation unit, for example in a brake control unit. In the schematic exemplary embodiment shown in FIG. 1, a sensor axis 15a of the sensor device 15 is arranged such that the driver axis 5'a coincides with the sensor axis 15a. The sensor device 15 is in this case arranged coaxially with respect to the spindle unit 5' and attached and fastened to the brake caliper 4 from the brake-application side, as will be described below (see FIGS. 3-5). Furthermore, the sensor device 15 is coupled to the driver shaft 12a. Since the readjustment movement of the readjuster shaft 11a is transmitted by way of the synchronization unit 13 to the driver shaft 12a, it is possible here for the readjustment movement of the driver shaft 12a to be used for the detection of the wear. The coupling of the driver shaft 12a to the sensor device 15 may be realized in a variety of ways. This will be described in more detail below.

Furthermore, in this exemplary embodiment, the sensor device 15 is designed such that it can also detect the second variable, specifically an actuation stroke of the brake-application apparatus of the disc brake 1, which in this case is the movement of the brake rotary lever 9. The two detected variables are transmitted in superposed form to the encoder of the sensor device 15 by way of a sensor gearing 16, which is for example in the form of a superposition gearing and, for this purpose, has two inputs. With regard to the general function of a sensor device 15 of this type, reference is made to DE 102010032515 A1.

The actuation stroke is a linear movement (aside from the pivoting movement of the lever 9) and, in this case, for the detection as second variable, is converted into a rotational or a pivoting movement for the sensor device 15. This is performed by way of a stroke sensor drive 17, by way of which the sensor device 15 is coupled to the brake rotary lever 9. The stroke sensor drive 17 includes a stroke sensor actuator 18, which is connected to the brake rotary lever 9, and a stroke sensor drive unit 19, which is coupled to the sensor device 15.

Figure 3:
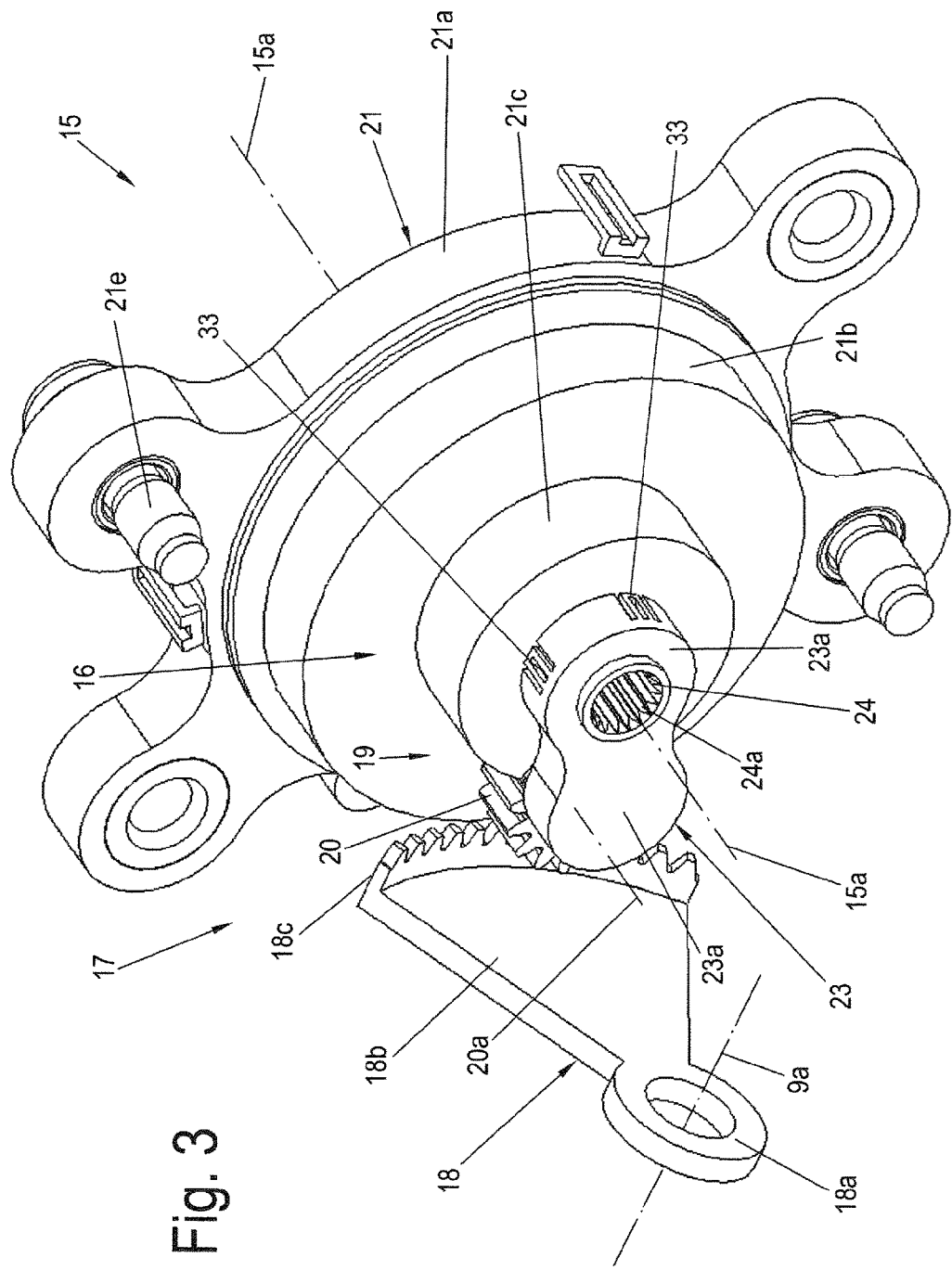
FIG. 3 is a schematic perspective view of a first exemplary embodiment of the sensor device according to the invention.
Figure 4:
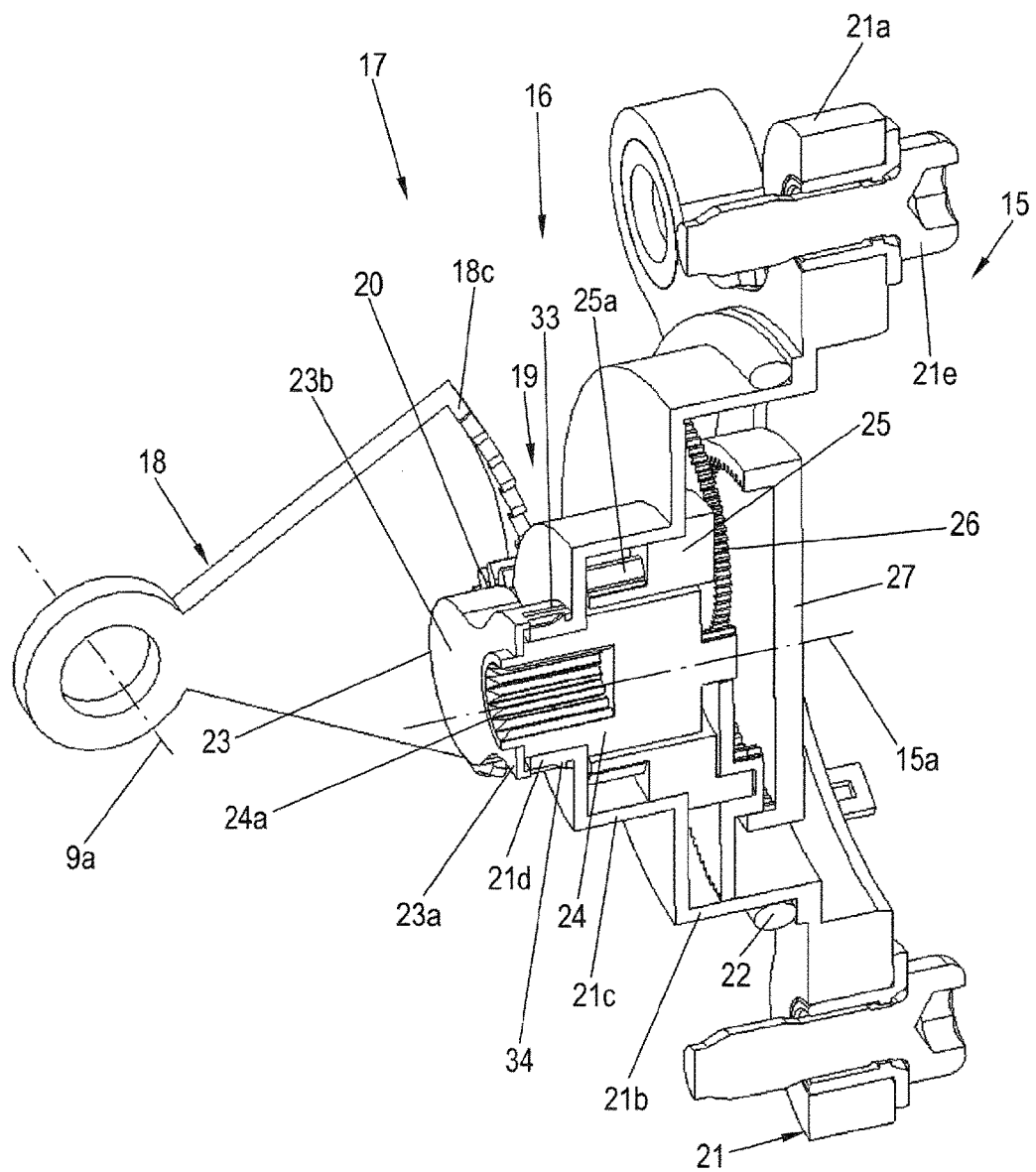
FIG. 4 is a schematic perspective sectional view of the first exemplary embodiment as per FIG. 3.
Figure 5:
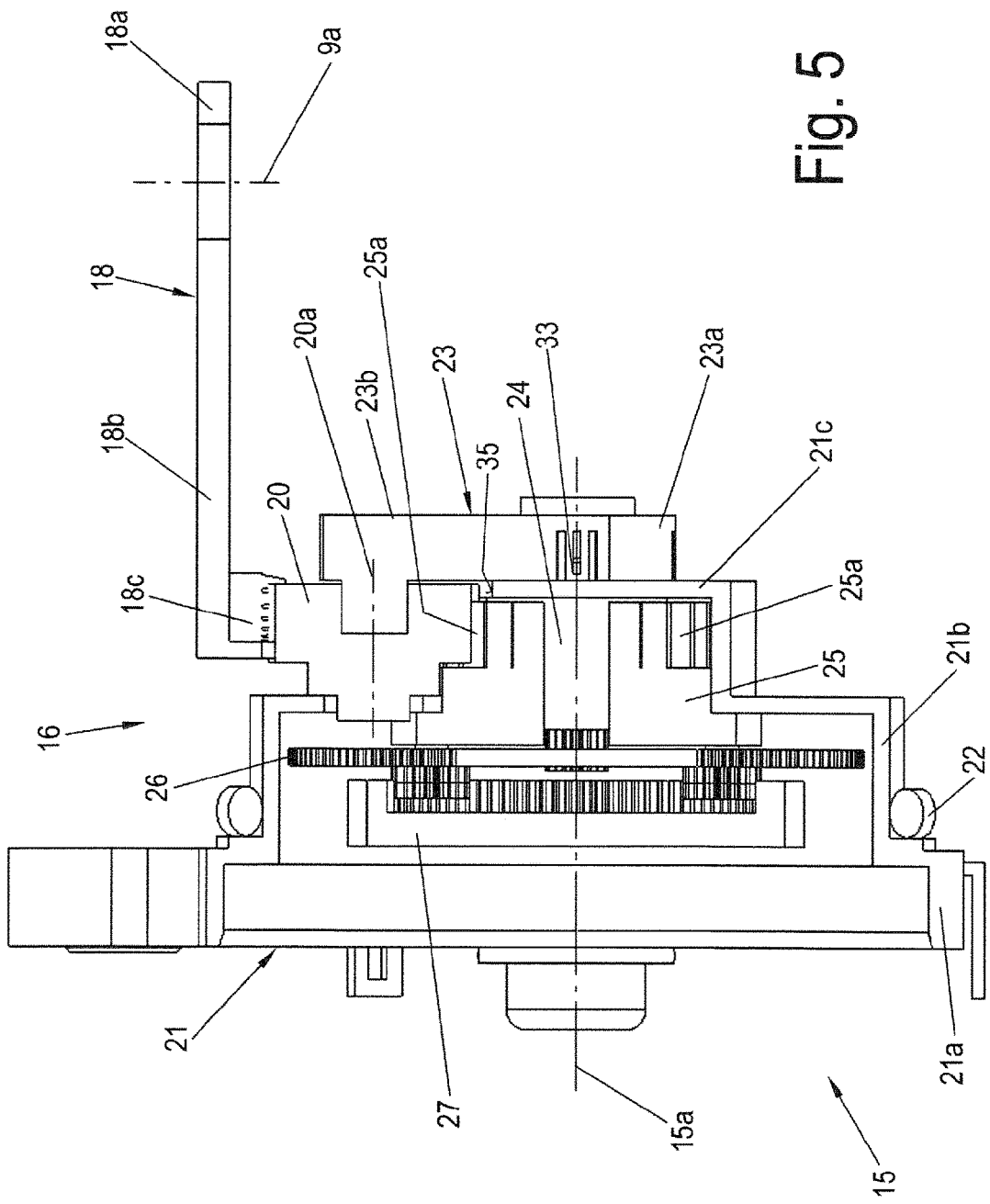
FIG. 5 is a further schematic sectional view of the first exemplary embodiment as per FIG. 3.

In this regard, FIG. 3 shows a schematic perspective view of a first exemplary embodiment of the sensor device 15 according to the invention. FIG. 4 illustrates a schematic perspective sectional view of the first exemplary embodiment as per FIG. 3. FIG. 5 shows a further schematic sectional view of the first exemplary embodiment as per FIG. 3.

In FIGS. 3 to 5, the stroke sensor drive 17 with the stroke sensor actuator 18 and the stroke sensor drive unit 19 is illustrated together with the sensor device 15 in various views and sections. Accordingly, FIG. 4 shows a section, perpendicular to the lever pivot axis 9a, through the sensor axis 15a, which coincides with the driver axis 5'a. The sectional view of FIG. 5 is a section, parallel to the sensor axis 15a which coincides with the driver axis 5'a, in the plane of the lever pivot axis 9a.

The sensor device 15 with its sensor axis 15a has a housing 21 which accommodates both the encoder and the sensor gearing 16.

It is possible for the sensor device 15 to be designed either with an encoder or without an encoder. The encoder may also be installed retroactively.

In this example, the housing 21 includes a housing flange 21a and two gearing receptacles 21b and 21c. The housing flange 21a has, on its circumference, one type of radially projecting eyelets for the fastening to the brake caliper 4 (see FIG. 1), wherein, for this purpose, fastening elements 21e, for example screws, are used for the fastening action. Here, the sensor device 15 is attached to the housing flange 21a from the outside (see FIG. 1), that is to say from the brake-application side. Furthermore, the housing flange 21a is equipped with rectangular holding tabs (not designated in any more detail) which are provided for the fixing of a cover to the encoder (which is likewise not shown). The holding tabs may, for example, interact with corresponding holding lugs of the cover with a clip-type action.

On the housing flange 21a, on the side facing toward the brake disc 2 (see FIG. 1), the housing flange is connected to the first gearing receptacle 21b. The gearing receptacle 21b is cylindrical and has a wall which projects toward the side of the brake disc 2 and which, at the brake disc side, is partially closed by a ring-shaped plate. The wall of the first gearing receptacle 21b has an outer diameter which is smaller than an outer diameter of a shoulder which is arranged in the connection between the first gearing receptacle 21b and the housing flange 21a. On the shoulder, there is in this case mounted a seal 22, for example an O-ring, which is provided for sealing off the housing 21 of the sensor device 15 with respect to the brake caliper 4.

The ring-shaped plate of the first gearing receptacle 21b has a bore. The edge of the bore is connected to a wall of the second gearing receptacle 21c, which is of partially cylindrical form with an opening 35 (see FIGS. 5 and 6), the function of which will be described below. The partially cylindrical wall also projects toward the side facing the brake disc 2 and, at the brake disc side, is partially also closed off by way of a ring-shaped plate. The wall of the second gearing receptacle 21c has an outer diameter smaller than the outer diameter of the wall of the first gearing receptacle 21b. The ring-shaped plate of the second gearing receptacle 21c is equipped with a bore, at the edge of which a cylindrical bearing section 21d projects toward the brake disc 2.

The housing 21 with the housing flange 21a, the gearing receptacles 21b, 21c including the ring-shaped plates and the bearing section 21d is, for example, produced in one piece from a suitable material. The material may, for example, be plastic or a metal or a combination of both.

The sensor gearing 16 is in this case in the form of a planetary gearing and comprises a sun gear 24, a planet carrier 25 with planet gears 26, and an internal gear 27. The sensor gearing 16 is in each case shown only as far as its internal gear 27, wherein the encoder coupled thereto is not illustrated, and may vary depending on the selected measurement principle.

The internal gear 27 and a section of the planet carrier 25 with the planet gears 26 and further gearing stages, which will not be discussed in any more detail here, are arranged in the first gearing receptacle 21b. The planet carrier 25 is received, by way of a shaft shoulder, in the bore of the ring-shaped plate of the first gearing receptacle 21b, wherein a section, pointing toward the brake disc 2, of the planet carrier 25 is arranged with a planet carrier toothing 25a in the second gearing receptacle 21c. The planet carrier toothing 25a is an external toothing.

The sun gear 24 is received within the planet carrier 25, wherein the sun gear 24 is mounted by way of a shaft shoulder in the bore of the ring-shaped plate of the second gearing receptacle 21c. A pinion of the sun gear 24 projects from a brake-application-side end section of the sun gear 24 into the first gearing receptacle 21b and engages with sun gears 26. The other, brake-disc-side end section of the sun gear 24 is lengthened such that it is mounted entirely in the bearing section 21d of the housing 21, extends through the bearing section and projects out of the bearing section to a certain extent. Furthermore, the brake-disc-side end section of the sun gear 24 is equipped with an internal coupling section 24a which, with an internal toothing, for example a serration, extends in the sun gear 24 from an opening at the brake-disc-side end of the sun gear, through the bearing section 21d and into the second gearing receptacle 21c. The coupling section 24a in this case forms an input for the first variable to be detected by the sensor device 15, specifically the wear, and is provided for the coupling of the sensor device 15 to the driver shaft 12a (or to the readjuster shaft 11a, which is not shown but is contemplated, for example in the case of a single-plunger design of the disc brake 1). For this purpose, the associated end of the driver shaft 12a (or of the readjuster shaft 11a) or of an intermediate part, has a corresponding profiling. The coupling serves for the detection of wear, that is to say for the detection of a first variable, by way of the sensor device 15.

The sensor gearing 16 of the sensor device 15 is coupled to the stroke sensor drive unit 19 by way of the stroke sensor drive 17 for the detection of the second variable, specifically the actuation stroke.

The stroke sensor drive unit 19 has, in this case, a gearing stage with a toothed gear 20 with a toothed gear axis 20a. In this exemplary embodiment, the toothed gear 20 forms a coupling between the stroke sensor actuator 18 and the sensor gearing 16, as will be discussed in more detail below.

The stroke sensor actuator 18 is connected to the brake rotary lever 9. For the purposes of better clarity, the brake rotary lever 9 is not shown in FIGS. 3-5, with the exception of its lever pivot axis 9a. In conjunction with FIG. 1, the brake rotary lever 9 is however easily understood.

The stroke sensor actuator 18 is in this case formed as a type of circular segment with a flange 18a and with a flat segment body 18b and is fixedly connected, for example screwed, to the brake rotary lever 9 in a manner which is not illustrated. A centerline of the flange 18a corresponds in this case to the lever pivot axis 9a, wherein the lever pivot axis 9a in this case forms the pivot axis of the stroke sensor actuator 18. It can be clearly seen that the lever pivot axis 9a lies not only at right angles to the sensor axis 15a of the sensor device 15 but also with a height offset with respect thereto, that is to say lies in a different plane.

An axial offset, such as exists here between the lever pivot axis 9a and the sensor axis 15a, which in this case coincides with the driver axis 5'a, is a result of the design of the brake rotary lever 9 as an eccentric lever, and, for structural space reasons, cannot be compensated. A remedy is provided by the toothed gear 20, as discussed below.

To the outer circumference of the segment body 18b of the stroke sensor actuator 18 there is attached a toothing 18c which, in this example, projects axially from the segment body 18b toward the sensor device 15. In this case, the toothing 18c is provided in the form of a crown gear toothing, which engages with the toothed gear 20 of the stroke sensor drive unit 19. The toothed gear axis 20a of the toothed gear 20 runs at right angles to the lever pivot axis 9a and at the same time parallel to the sensor axis 15a of the sensor device 15. Furthermore, the toothed gear axis 20a lies in the same plane as the lever pivot axis 9a. In this way, the axial offset between the lever pivot axis 9a and the sensor axis 15a is compensated.

The toothed gear 20 is held in rotatable fashion by way of a bracket 23. The bracket 23 has a body with a fastening section 23a and with a gearing section 23b. The fastening section 23a and the gearing section 23b are cylindrical sections, the central axes of which run parallel and which are connected to one another. The fastening section 23a has a passage bore, wherein an outer wall is equipped with flexible holding arms 33 which, in this case, are formed into the outer wall. The gearing section 23b is flat and closed at the brake disc side, wherein the gearing section is, in the direction of the housing 21, formed with a bearing bolt (not designated in any more detail) which forms a bearing and axial delimitation for the toothed gear 20. This can be clearly seen in FIG. 5. The toothed gear 20 is furthermore held in the cover plate of the first gearing receptacle 21b of the housing 21. Here, the cover plate forms a further axial delimitation of the toothed gear 20, with a certain required axial play being maintained.

The bracket 23 is mounted by way of its fastening section 23a on the bearing section 21d of the housing 21, wherein centering of the bracket 23 is realized by virtue of a shaft shoulder of the brake-disc-side end section of the sun gear 24 being received in the passage bore of the fastening section 23a. Fixing of the bracket 23 on the bearing section 21d of the housing 21 is realized by way of an interaction of the flexible holding arms 33 of the outer wall of the fastening section 23a of the bracket 23 with the encircling lug 34 of the bearing section 21d of the housing 21. The flexible holding arms 33 are, for engagement with detent action with the lug 34, formed with notches or lugs corresponding thereto. The flexible holding arms 33 and the lug 34 in this case form a clip-type connection. Other connection types are self-evidently also possible.

Here, the toothed gear 20 is a spur gear, and in this exemplary embodiment, the toothed gear forms a transmission ratio stage between the stroke sensor actuator 18 and the planet carrier 25 of the sensor gearing 16. In this case, the planet carrier 25 forms an input for the second variable to be detected by the sensor device 15, specifically the actuation stroke. Here, the toothed gear 20 engages at one side with the toothing 18c of the stroke sensor actuator 18 and at the other side with a planet carrier toothing 25a of the planet carrier 25. Since the planet carrier 25 is arranged within the second gearing receptacle 21c, the partially cylindrical wall thereof has the opening 35, through which the engagement between the toothed gear 20 and the planet carrier toothing 25a is made possible. This is schematically illustrated in FIG. 5.

By way of the toothed gear 20, it is possible for the actuation stroke in the form of a pivoting movement of the brake rotary lever 9, and thus of the stroke sensor actuator 18 that is fixedly connected to the brake rotary lever 9, about the lever pivot axis 9a to be transmitted with a certain transmission ratio to the planet carrier 25 as input, and thus to the internal gear 27 and onward to the encoder of the sensor device 15. The transmission ratio stage with the toothed gear 20 or else with further toothed gears (not shown, but conceivable) furthermore makes it possible for a rotational movement of the internal gear 27 to be configured such that a measurement effect of the actuation stroke is adequately "mechanically boosted". For a precise detection of the actuation stroke, the transmission takes place with the least possible play.

An angular gearing is normally, with few exceptions, considerably more sensitive to tolerances than a spur gear mechanism. In this exemplary embodiment, the angular gearing formed by the crown toothing of the stroke sensor actuator 18 and the toothed gear 20 is relatively insensitive with regard to position tolerances.

Furthermore, realization of variants, that is to say detection of only one variable (wear) or of two variables (wear and actuation stroke) is possible in a straightforward manner using the same sensor device 15. For this purpose, the sensor device 15 can be converted from the first state into the second state.

Figure 6:
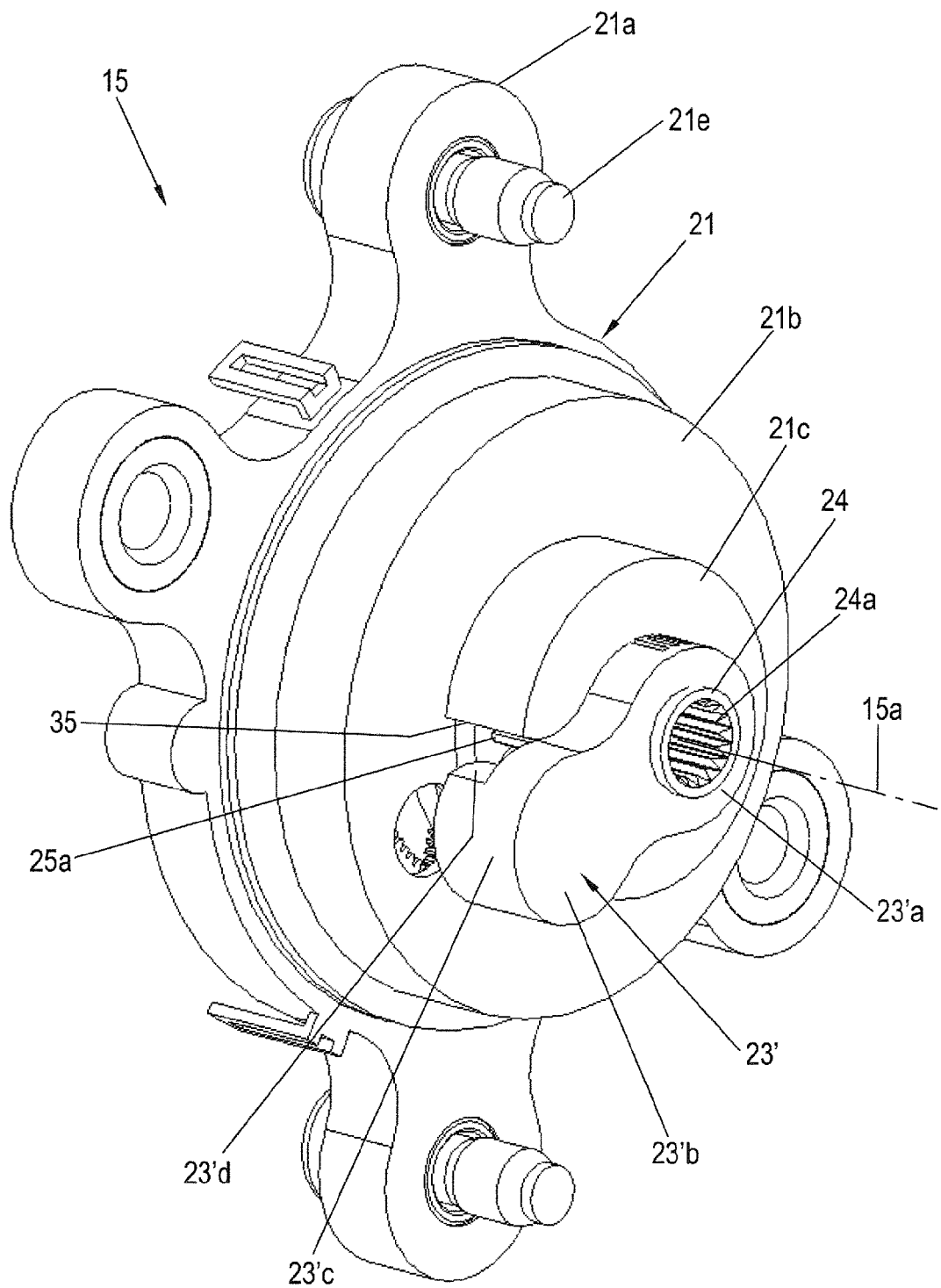
FIG. 6 is a schematic perspective view of a variant of the first exemplary embodiment of the sensor device according to the invention.
Figure 7:
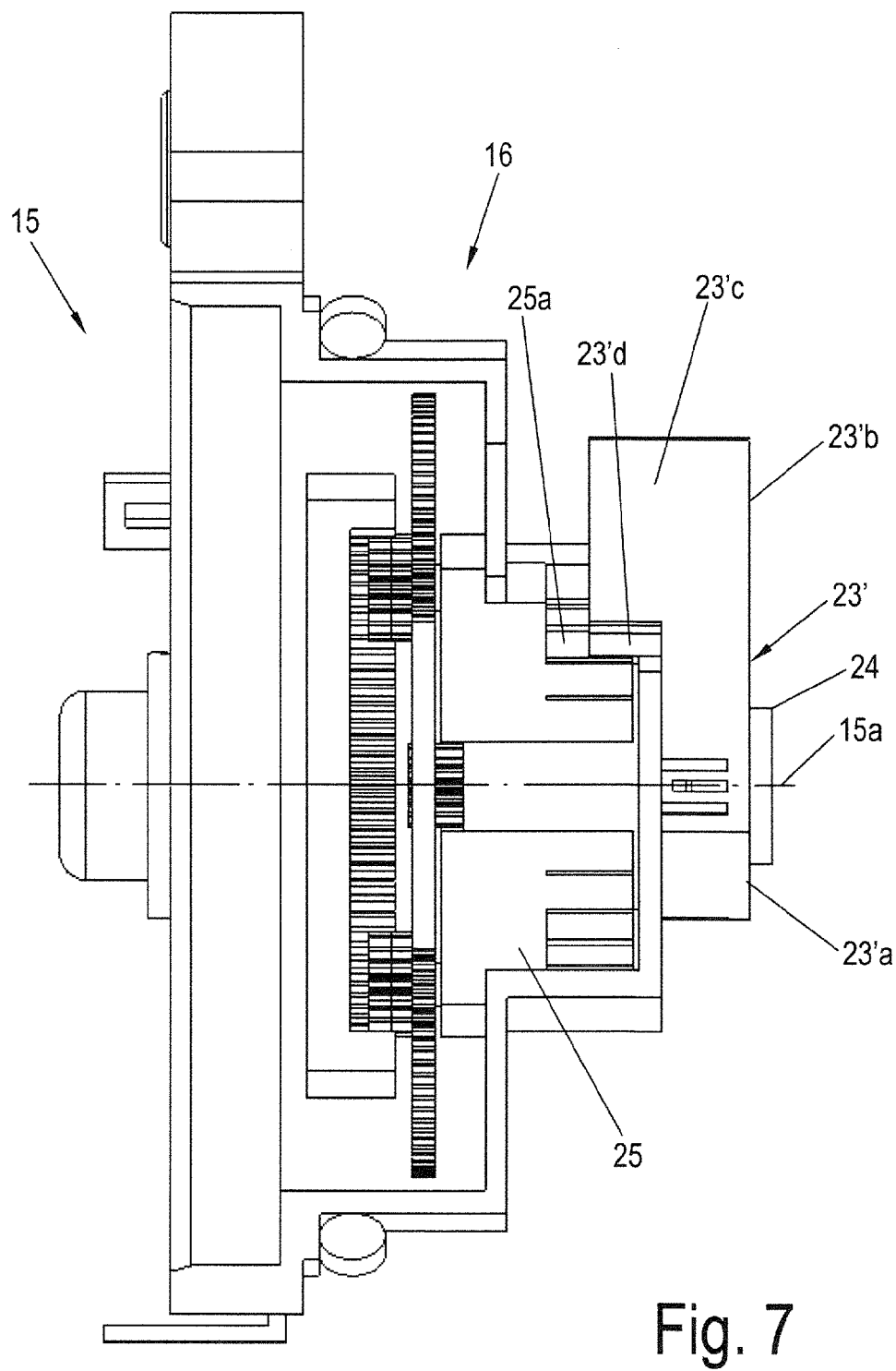
FIG. 7 is a schematic perspective sectional view of the variant as per FIG. 6.

In this regard, FIG. 6 shows a schematic perspective view of a variant of the first exemplary embodiment of the sensor device 15 according to the invention. FIG. 7 illustrates a schematic perspective sectional view of the variant as per FIG. 6. Similarly to FIG. 5, the sectional view of FIG. 7 is a section, parallel to the sensor axis 15a that coincides with the driver axis 5'a, in the plane of the lever pivot axis 9a, which is not shown here but is contemplated.

In the case of the sensor device 15 being used in the second state for only one variable to be detected, specifically for the wear, the sensor device 15 can be correspondingly converted for this purpose. Such a conversion is realized by virtue of the input for the second variable being blocked, that is to say the planet carrier 25 being fixed. For such a setting, the stroke sensor drive 17 with the stroke sensor actuator 18 and the stroke sensor drive unit 19 with the toothed gear 20 is omitted. Blocking of the input for the second variable is achieved by virtue of the planet carrier 25, which is now no longer in engagement with the toothed gear 20, being rotationally fixed. Such rotational fixing may be realized by way of a fixing part (not shown) which is used instead of the toothed gear 20, wherein the fixing part is connected rotationally fixedly to the bracket 23.

A further rotational fixing action is possible by way of an alternative bracket 23'.

The alternative bracket 23' has a fastening section 23'a, which corresponds to the above-described fastening section 23 of the bracket 23, and a gearing section 23'b. The gearing section 23'b is designed so as to extend, at the brake-application side, into the opening 35 of the second gearing receptacle 21c and to interact with the edge of the opening 35 such that a pivoting movement of the bracket 23' about the sensor axis 15a is blocked. Furthermore, the gearing section 23'b is equipped with a fixing tooth 23'd which engages with the planet carrier toothing 25a in the region of the opening 35 of the housing 21. Since the fixing tooth 23'd is fixedly connected to the gearing section 23'b and thus to the static, alternative bracket 23', the planet carrier 25 is blocked in this way.

In this simple way, it is possible for the sensor device 15 to be converted from the first state, for detecting both of the two variables, into the second state, for detecting only one variable, specifically the first variable, through the use of the bracket 23 with toothed gear 20 or the alternative bracket 23' without toothed gear 20. This conversion may self-evidently also be reversed by virtue of the toothed gear 20 with the associated bracket 23 being used.

Figure 8:
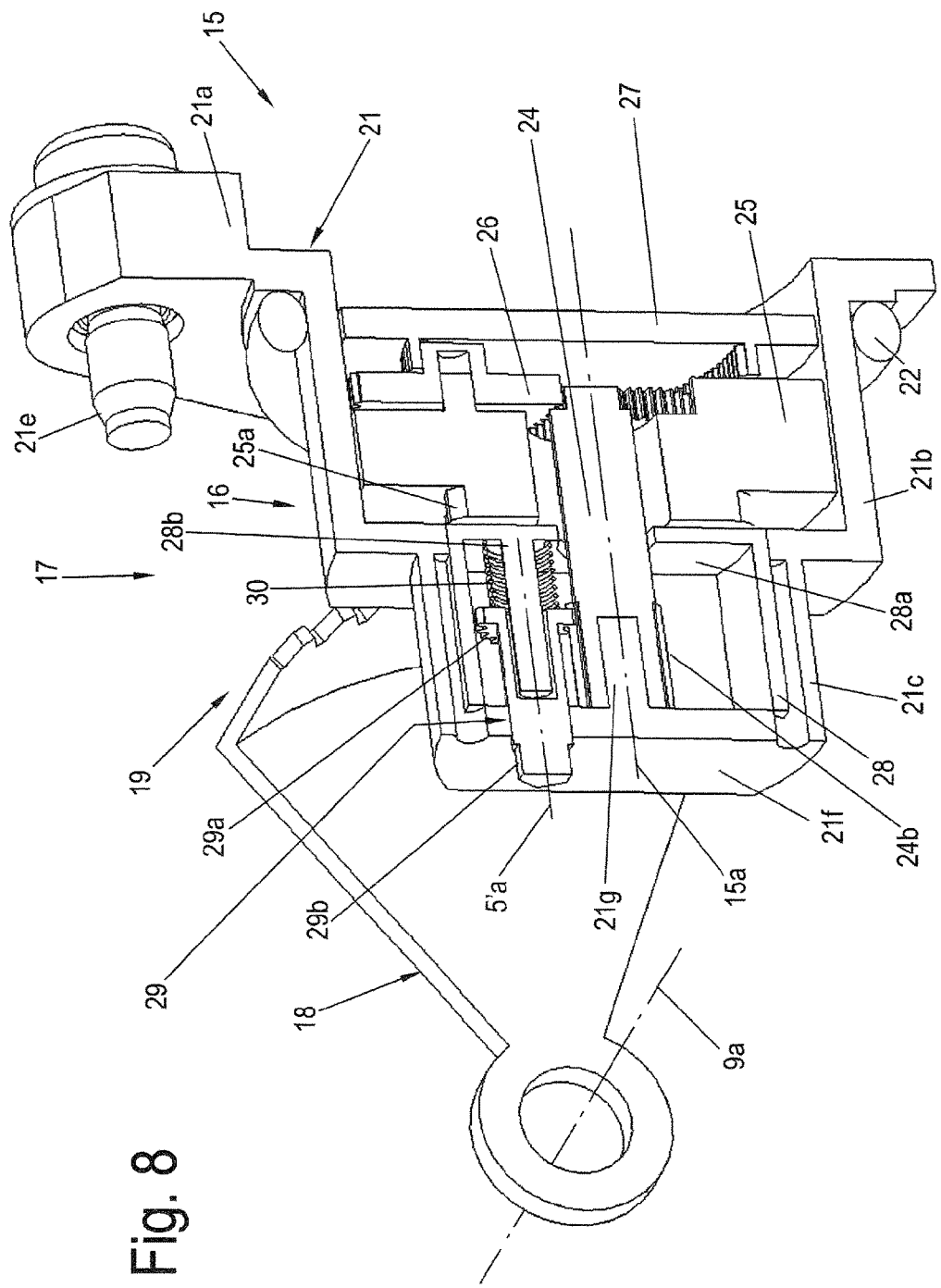
FIG. 8 is a schematic sectional view of a second exemplary embodiment of the sensor device according to the invention.
Figure 9:
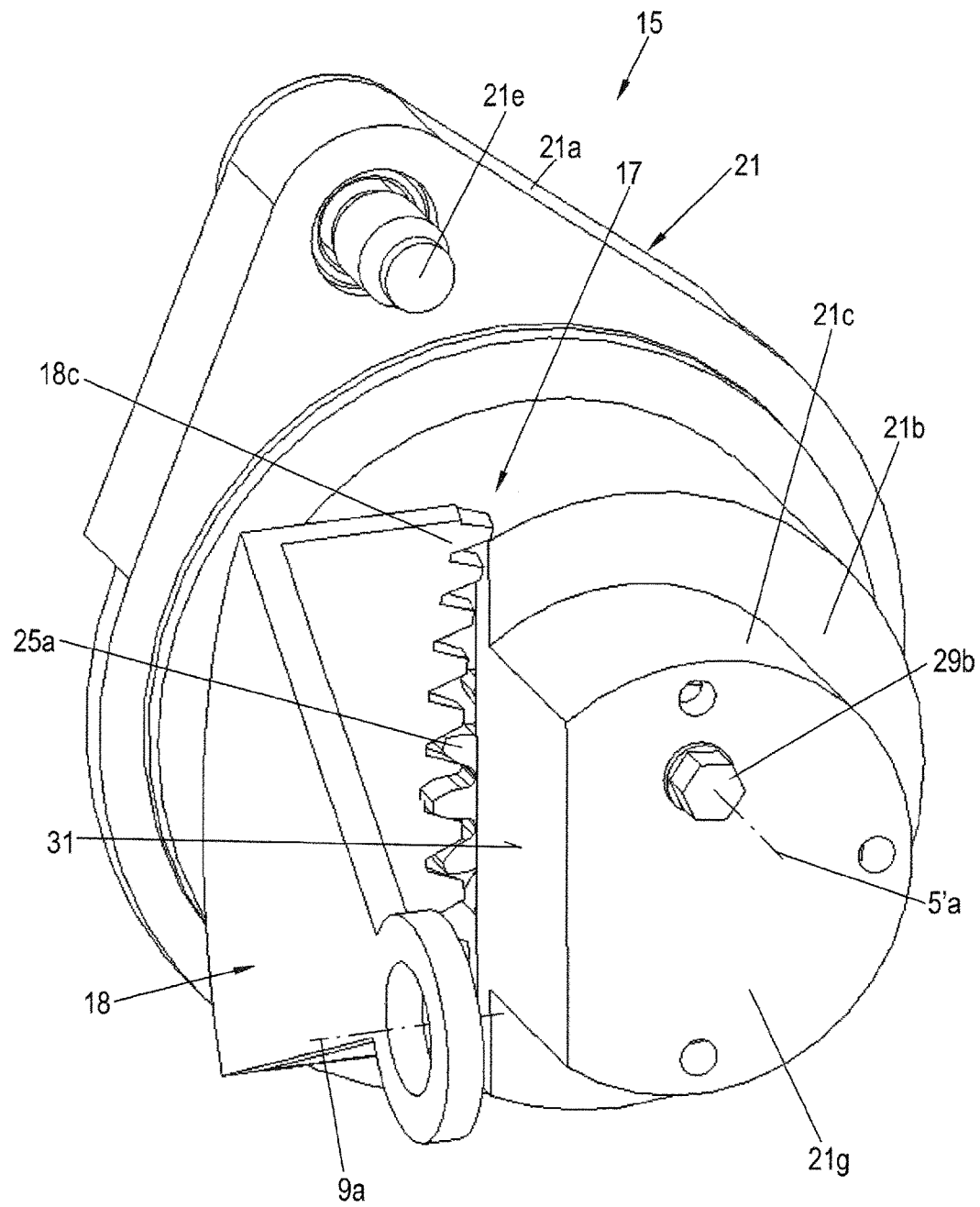
FIG. 9 is a schematic perspective view of the second exemplary embodiment as per FIG. 8.

FIG. 8 shows a schematic sectional view of a second exemplary embodiment of the sensor device 15 according to the invention, and in this regard, FIG. 9 illustrates a schematic perspective view of the second exemplary embodiment, as per FIG. 8. The sectional view of FIG. 8 is a section in the plane of the lever pivot axis 9a, parallel to the driver axis 5'a and parallel to the sensor axis 15a arranged with the axial offset with respect to the driver axis. The sensor device 15 is firstly shown in the first state for the detection of the first and second variables.

In the second exemplary embodiment, the lever pivot axis 9a and the sensor axis 15a are situated on a common plane. The sensor axis 15a in this case does not run through the driver axis 5'a; the latter is arranged offset with respect to and above the sensor axis 15a, perpendicularly to the plane of the lever pivot axis 9a or of the sensor axis 15a, with a spacing which corresponds to the axial offset. Thus, the axial offset exists between the lever pivot axis 9a and the driver axis 5'a.

In this way, it is possible for the toothing 18c, that is to say the crown gear toothing, of the stroke sensor actuator 18 to be in direct engagement with the planet carrier toothing 25a of the planet carrier 25. It is self-evidently also possible for an intermediate gearing stage to be provided in order to achieve a particular transmission ratio. In this case, too, the planet carrier 25 thus forms the input for the second variable to be detected by the sensor device 15.

In this second exemplary embodiment, the housing 21 of the sensor device 15 has a different construction in relation to the first exemplary embodiment. An axial length of the wall of the first gearing receptacle 21b in this case corresponds approximately to the sum of the axial lengths of the walls of the first gearing receptacle 21b and of the second gearing receptacle 21c of the first exemplary embodiment, because in the second exemplary embodiment, the internal gear 27 is arranged together with the planet gears 26 and the planet carrier 25 in the first gearing receptacle 21b.

The engagement of the toothing 18c, that is to say crown gear toothing, of the stroke sensor actuator 18 with the planet carrier toothing 25a, for example a spur gear toothing, of the planet carrier 25 takes place in an opening of the wall of the first gearing receptacle 21b. The opening is formed in a planar surface section 31 (see FIG. 9), which planar surface section forms a lateral flattened portion of the first gearing receptacle 21b and second gearing receptacle 21c.

The second gearing receptacle 21c is closed off by way of a plate 21f which, in its interior, has an axle section 21g which is arranged centrally with respect to the sensor axis 15a and which serves for receiving the brake-disc-side end of the sun gear 24. The sun gear 24 has its pinion on the brake-application-side end within the first gearing receptacle 21b, and is formed without shaft shoulders in the region of the second gearing receptacle 21c. In the brake-disc-side end region of the sun gear 24 there is provided an internal bore for receiving the axle section 21g, and on the outer side of the brake-disc-side end region, there is provided a toothing 24b.

Within the second gearing receptacle 21c there is inserted a pot-shaped insert support 28 with an insert base 28a. The open side of the insert support 28 points toward the brake disc 2. The insert base 28a has a bore which is concentric with respect to the sensor axis 15a and through which the sun gear 24 extends between the interior of the first gearing receptacle 21b and the second gearing receptacle 21c. A bolt-like axle section 28b is attached to the insert base 28a vertically above the sensor axis 15a with a spacing which corresponds to the axial offset between the lever pivot axis 9a and the driver axis 5'a, which bolt-like axle section projects from the insert base 28a toward the brake disc 2. The axle section 28b serves for receiving a drive shaft 29, which is mounted by way of an internal bore onto the axle section 28b.

A brake-application-side end of the drive shaft 29 is formed with a drive gear 29a, the toothing of which engages with the toothing 24b of the sun gear 24. The drive gear 29a and the toothing 24b thus also form a gearing stage (spur gear stage) similarly to the toothed gear 20 for the compensation of the axial offset.

The drive shaft 29 is held on the axle section 28b so as to be guided in axially displaceable fashion, wherein the toothing of the drive gear 29a, in engagement with the toothing 24b, for example spur gear toothing, of the sun gear 24, is displaceable relative to the toothing 24b.

A spring element 30 is arranged, around the axle section 28b, between the brake-application-side end of the drive shaft 29 and the insert base 28a. The spring element exerts an axial preload force on the drive shaft 29 in the direction of the brake disc 2. The inner side of the plate 21f forms an axial abutment for the drive gear 29a and thus for the drive shaft 29.

In this case, the drive shaft 29 forms the input for the first variable to be detected by the sensor device 15, specifically the wear, wherein a brake-disc-side end of the drive shaft 29 has a drive coupling section 29b which is designed for coupling to the brake-application-side end of the driver shaft 12a or to an intermediate component for this purpose, for example to a hexagonal profile. The axial preload force of the spring element 30 compensates axial spacings between the end, which is to be coupled on, of the driver shaft 12a and the drive shaft 29, and ensures reliable coupling. The drive shaft 29 extends in the direction of the brake disc 2 through a bore of the plate 21f of the second gearing receptacle 21c, wherein the brake-disc-side end of the drive shaft 29 with the drive coupling section 29b projects from the outer side of the plate 21f in the direction of the brake disc 2.

In this second exemplary embodiment, the wall of the second gearing receptacle 21c is not designed to be entirely of encircling circular form, but is rather equipped with the lateral flattened portion, which forms the surface section 31. Thus, a cross section of the second gearing receptacle 21c has, laterally, a straight portion, whereby the pot-shaped insert support 28, which is formed with a cross section corresponding thereto, can be inserted into the second gearing receptacle 21c with unambiguous positioning, and so as to be non-rotatable about its axis.

Furthermore, the flattened portion with the surface section 31 facilitates installation of the sensor device 15 in the axial direction, such that the second gearing receptacle 21c can be moved past the toothing 18c of the stroke sensor actuator 18.

The second exemplary embodiment of the sensor device 15 can also be converted from the first state that is shown into the second state for detecting only one variable, specifically the first variable (wear).

Figure 10:
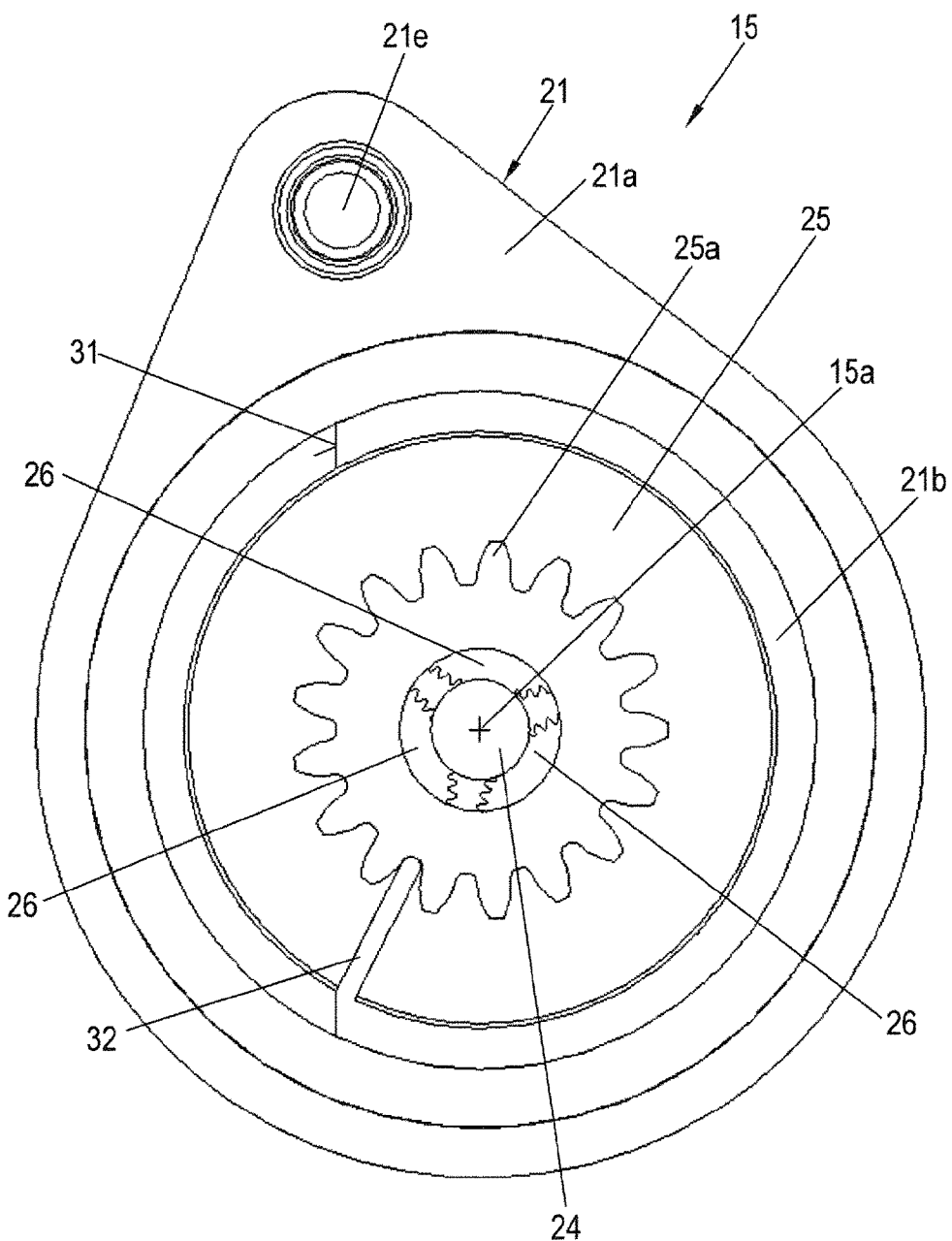
FIG. 10 is a further schematic sectional view of the second exemplary embodiment as per FIG. 8.

This is illustrated in FIG. 10 in a further schematic sectional view of the second exemplary embodiment as per FIG. 8. The section runs, in a plane perpendicular to the sensor axis 15a, through the first gearing receptacle 21b in the region of the planet carrier toothing 25a.

In this case, too, the sensor device 15 is converted from the first state into the second state, for detecting only one variable, specifically the first variable, by virtue of the input for the second variable, that is to say the planet carrier 25, being blocked. Blocking is effected, by way of the fixing of the planet carrier 25, in that at least one fixing arm 32 which is fixedly connected to the housing 21, that is to say to the wall of the first gearing receptacle 21b, engages with the planet carrier toothing 25a and thus rotationally fixedly blocks the planet carrier 25.

In one variant, the fixing arm 32 is designed such that, for the variant of the sensor device 15 for detecting two variables, in order to permit the rotatability of the planet carrier 25, the fixing arm can be broken away, for example by way of a predetermined breaking point. The convertibility is thus irreversible.

Another variant provides reversible convertibility in that the fixing arm 32, as a separate part, can be attached and removed again, for example as a plug-in component in a guide of the wall of the first gearing receptacle 21*b*. Several fixing arms 32 are self-evidently possible.

The above-described exemplary embodiments do not restrict the invention.

For example, it is contemplated for the blocking of the planet carrier 25 in the second state of the sensor device 15 to be realized by virtue of the toothed gear 20 being rotationally fixedly blocked by way of a fixing pin with the bracket 23, by virtue of the fixing pin being inserted through a bore of the bracket 23 into a bore, provided for the purpose, in the toothed gear 20.

The fixing arm 32 may also be a constituent part of an insert part, which can, for example, be clipped into and removed again from the opening of the first gearing receptacle 21*b*.

Accordingly, it is for example possible for the crown gear toothing 18*c* of the stroke sensor actuator 18 to be coupled to the internal gear 28 rather than the planet carrier 25, wherein the internal gear 28 has a corresponding toothing for this purpose.

Intermediate gearing stages between crown gear toothing 18*c* of the stroke sensor actuator 18 and the planet carrier 25 or internal gear 28 are self-evidently possible.

It is contemplated that, instead of a potentiometer, some other unit is provided in the sensor device, for example an angle sensor with Hall elements.

Instead of the crown gear toothing of the toothing 18*c* of the stroke sensor actuator 18 and of the toothed gear 20, bevel gear toothings are also contemplated, wherein the toothed gear 20 has a further toothing, for example spur gear toothing, for the coupling to the sensor gearing 16.

LIST OF REFERENCE DESIGNATIONS

1 Disc brake
2 Brake disc
2*a* Brake disc axis
3 Brake pad
3*a* Brake pad support
4 Brake caliper
5, 5' Spindle unit
5*a* Readjuster axis
5'*a* Driver axis
6, 6' Threaded tube
6*a*, 6'*a* Thrust piece
7 Bridge
8 Restoring spring
9 Brake rotary lever
9*a* Lever pivot axis
9*b* Lever arm
10 Wear-compensating readjustment apparatus
11 Readjustment device
11*a* Readjuster shaft
12 Driver
12*a* Driver shaft
13 Synchronization unit
13*a*, 13'*a* Synchronization gear
13*b* Synchronization means
14 Readjuster drive
14*a* Actuator
14*b* Readjuster drive element
15 Sensor device
15*a* Sensor axis
15*b* Sensor connection line
16 Sensor gearing
17 Stroke sensor drive
18 Stroke sensor actuator
18*a* Flange
18*b* Segment body
18*c* Toothing
19 Stroke sensor drive unit
20 Toothed gear
20*a* Toothed gear axis
21 Housing
21*a* Housing flange
21*b*, 21*c* Gearing receptacle
21*d* Bearing section
21*e* Fastening element
21*f* Base
21*g* Axle section
22 Seal
23, 23' Bracket
23*a*, 23'*a* Fastening section
23*b*, 23'*b* Gearing section
23'*c* Fixing section
23'*d* Fixing tooth
24 Sun gear
24*a* Coupling section
24*b* Toothing
25 Planet carrier
25*a* Planet carrier toothing
26 Planet gear
27 Internal gear
28 Insert support
28*a* Insert base
28*b* Axle section
29 Drive shaft
29*a* Drive gear
29*b* Drive coupling section
30 Spring element
31 Surface section
32 Fixing arm
33 Holding arm
34 Lug
35 Opening The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor device for a disc brake, comprising:
   a sensor gearing coupleable to at least one encoder;
   a housing in which is arranged the sensor gearing, the sensor gearing being a planetary gearing having an input for a first variable to be detected by the sensor device and an input for a second variable to be detected by the sensor device, wherein
   the first variable is associated with wear of the disc brake and the second variable is associated with an actuation stroke of the disc brake,
   the sensor device is configured to be convertible from a first state for detecting the first variable associated with the wear of the disc brake and the second variable associated with the actuation stroke of the disc brake, into a second state for detecting only the first variable associated with the wear of the disc brake.

2. The sensor device according to claim 1, wherein:
the input for the first variable to be detected is a sun gear of the sensor gearing, and
the input for the second variable to be detected is a planet carrier of the sensor gearing having a planet carrier toothing.

3. The sensor device according to claim 2, wherein:
in the first state of the sensor device, the input for the second variable to be detected is in engagement with a stroke sensor drive unit, and
in the second state of the sensor device, the input for the second variable is blocked.

4. The sensor device according to claim 3, wherein the stroke sensor drive unit comprises at least one toothed gear which, in the first state of the sensor device, engages with the planet carrier toothing in an opening of the housing, wherein the planet carrier toothing is an external toothing.

5. The sensor device according to claim 4, wherein the at least one toothed gear is rotatably mounted, and is axially delimited, in a bracket and in the housing.

6. The sensor device according to claim 5, wherein the bracket is fastened removably to the housing.

7. The sensor device according to claim 3, wherein:
the input for the second variable to be detected is, in the second state of the sensor device, rotationally fixedly blocked by at least one fixing tooth of a bracket connected rotationally fixedly to the housing, and
the at least one fixing tooth is in engagement with the planet carrier toothing in an opening of the housing, wherein the planet carrier toothing is an external toothing.

8. The sensor device according to claim 7, wherein the bracket is fastened removably to the housing.

9. The sensor device according to claim 1, wherein:
the input for the first variable to be detected is a drive shaft having at least one gearing stage coupled to a sun gear of the sensor gearing, and
the input for the second variable to be detected is a planet carrier of the sensor gearing having a planet carrier toothing.

10. The sensor device according to claim 9, wherein:
in the first state, the input for the second variable to be detected is in engagement with a stroke sensor drive unit or is provided for direct engagement of a stroke sensor actuator of an associated disc brake, and
in the second state, the input for the second variable to be detected is blocked.

11. The sensor device according to claim 10, wherein:
in the second state, the input for the second variable to be detected is rotationally fixedly blocked by at least one fixing arm, and
the at least one fixing arm is in engagement with the planet carrier toothing, which planet carrier toothing is an external toothing.

12. The sensor device according to claim 11, wherein the at least one fixing arm is fastened removably to the housing or is connected severably to the housing via a predetermined breaking section.

13. The sensor device according to claim 11, wherein the at least one fixing arm is an insert part that is insertable rotatably fixedly into, and removable from, the housing.

14. The sensor device according to claim 1, further comprising the at least one encoder, wherein the at least one encoder is coupled to the sensor gearing.

15. A disc brake for a motor vehicle, comprising:
a brake-application apparatus having a spreading mechanism;
a wear-compensating readjustment apparatus having at least one mechanical readjustment device coupled to the spreading mechanism; and
a sensor device for the disc brake, the sensor device comprising:
a sensor gearing coupleable to at least one encoder;
a housing in which is arranged the sensor gearing, the sensor gearing being a planetary gearing having an input for a first variable to be detected by the sensor device and an input for a second variable to be detected by the sensor device, wherein
the first variable is associated with wear of the disc brake and the second variable is associated with an actuation stroke of the disc brake,
the sensor device is configured to be convertible from a first state for detecting the first variable associated with the wear of the disc brake and the second variable associated with the actuation stroke of the disc brake, into a second state for detecting only the first variable associated with the wear of the disc brake,
the input for the first variable to be detected is coupled to the at least one mechanical readjustment device, and
the input for the second variable to be detected is coupled to the spreading mechanism via a stroke sensor drive.

16. The disc brake according to claim 15, wherein:
the spreading mechanism is a brake rotary lever and the disc brake comprises at least two spindle units with the mechanical readjustment device being insertable into a respective one or the two spindle units,
the mechanical readjustment device is coupled to a driver via a synchronization unit, and
the input for the first variable to be detected is coupled to a driver shaft of the driver.

17. The disc brake according to claim 16, wherein the stroke sensor drive has an angular gearing.

18. The disc brake according to claim 17, wherein the stroke sensor drive having the angular gearing comprises a stroke sensor actuator with a crown gear toothing.

19. The disc brake according to claim 15, wherein an axial offset between a plane of a lever pivot axis of a brake rotary lever forming the spreading mechanism and a plane of a sensor axis of the sensor device is compensated via a gearing stage of the stroke sensor drive.

20. The disc brake according to claim 15, wherein
the sensor device is arranged in the disc brake such that an axial offset between a plane of a lever pivot axis of the brake rotary lever, in which a sensor axis of the sensor device lies, and a plane of an axis of a spindle unit is compensated by a gearing stage of a drive unit which is an input for the first variable to be detected.

* * * * *